United States Patent [19]

Takahashi et al.

[11] 4,295,893

[45] Oct. 20, 1981

[54] ALUMINA-CONTAINING CALCIUM SILICATE AND PROCESS FOR PRODUCING SAME

[75] Inventors: Akira Takahashi; Kenichi Oohashi, both of Gifu, Japan

[73] Assignee: Kabushiki Kaisha Osaka Packing Seizosho, Osaka, Japan

[21] Appl. No.: 94,500

[22] Filed: Nov. 15, 1979

[51] Int. Cl.$^3$ .............................................. C04B 7/02
[52] U.S. Cl. .................................................. 106/120
[58] Field of Search ........................................ 106/120

[56] References Cited

U.S. PATENT DOCUMENTS 4,162,924  7/1979  Kubo et al. ............................ 106/99
4,193,958  3/1980  Uchida et al. ........................ 106/120

*Primary Examiner*—James Poer
*Attorney, Agent, or Firm*—Armstrong, Nikaido, Marmelstein & Kubovcik

[57] ABSTRACT

Alumina-containing calcium silicate being in the form of secondary particles, shaped bodies and a process for preparing the same, said secondary particles being composed of alumina-containing calcium silicate crystals having an index of crystallite antigrowth of at least 8 and interlocked with one another in the form of a globular shell, the particles being about 5 to about 70 μm in diameter, up to about 0.13 g/cm$^3$ in apparent density and at least 10 g per particle in initial breaking load, and said shaped bodies being composed of the secondary particles.

21 Claims, 8 Drawing Figures

ALUMINA-CONTAINING CALCIUM SILICATE AND PROCESS FOR PRODUCING SAME

BACKGROUND OF THE INVENTION

This invention relates to alumina-containing calcium silicate and a process for producing the same, and more particularly to secondary particles of alumina-containing calcium silicate, shaped bodies of such secondary particles of alumina-containing calcium silicate, aqueous slurries of such secondary particles of alumina-containing calcium silicate and processes for producing these secondary particles, shaped bodies and slurries.

Calcium silicate has found wide use in industries for refractory heat-insulating materials, fillers, adsorbents, reinforcing materials, building materials, etc. Since calcium silicate shaped bodies have the features of having high specific strength and heat-insulating properties and being light, highly dielectric and resistant to fire, they are expected to have wider application as inorganic materials. These characteristic properties appear attributable primarily to the form of calcium silicate crystals and to the structure of secondary particles of calcium silicate crystals in which the crystals are agglomerates and interconnected in a reticular arrangement.

We conducted research on the production and structure of secondary particles into which calcium silicate crystals are agglomerated in a peculiar mode and provided secondary particles of needlelike crystals of wollastonite group calcium silicate in the form of a porous shell which is globular to withstand external pressure most effectively with high stability and strength and which has a hollow interior and an outermost layer composed of closely interlocked crystals. We found that the secondary particles have high strength afforded by the globular shell-like form thereof and by the outermost layer of closely interlocked crystals and further possess an exceedingly low density because of their high degree of hollowness. We also found that shaped bodies with a very low density and high strength can be prepared from an aqueous slurry of such secondary particles merely by shaping the slurry and drying the shaped mass. Based on these findings, we accomplished an invention, which has matured to U.S. Pat. No. 4,162,924.

While the secondary particles described above have the distinct features that they are shaped to most effectively withstand external pressure with high stability and high strength and have a remarkably low apparent density, we have carried out continued research on various crystals in an attempt to replace the calcium silicate crystals constituting the secondary particles by other crystals without impairing these features in any way, and unexpectedly found that alumina-containing calcium silicate crystals are useful for realizing this entirely novel attempt and afford shaped bodies having further improved properties.

SUMMARY OF THE INVENTION

Accordingly an object of this invention is to provide secondary particles composed of alumina-containing calcium silicate crystals, shaped to withstand external forces with the highest stability and strength and having a remarkably low apparent density.

Another object of this invention is to provide shaped bodies composed of alumina-containing calcium silicate crystals, having an extemely low density and high strength and retaining great strength after having been fired at a high temperature of at least 1,000° C.

Another object of the invention is to provide aqueous slurries of alumina-containing calcium silicate crystals capable of giving such shaped bodies of alumina-containing calcium silicate crystals.

Still another object of the invention is to provide processes for producing globular shell-like secondary particles of alumina-containing calcium silicate, and above-mentioned shaped bodies and slurries.

Stated more specifically, the present invention provides super-lightweight secondary particles of alumina-containing calcium silicate characterized in that the particles are composed of alumina-containing calcium silicate crystals having an index of crystallite antigrowth of at least 8, preferably at least 10, and interlocked with one another in the form of a globular shell, the particles being about 5 to about 70 μm in diameter, up to about 0.13 g/cm$^3$ in apparent density and at least 10 g per particle in initial breaking load. The present invention also provides alumina-containing calcium silicate shaped bodies composed of such secondary particles as joined to one another, aqueous slurries comprising such secondary particles as uniformly dispersed in water, and processes for producing these secondary particles, shaped bodies and slurries.

BRIEF DESCRIPTION OF THE DRAWINGS

Reference

Reference

DESCRIPTION OF PREFERRED EMBODIMENTS

The term "index of crystallite antigrowth" as used in this specification refers to an index given by the following equation:

$$\text{Index of crystallite antigrowth}(S) = \frac{Da \times Db \times Dc}{Da' \times Db' \times Dc'} \times 100$$

where Da, Db and Dc are the dimensions of the crystallite-size in the planes of (400), (040) and (001) of an alumina-containing calcium silicate crystal, such as alumina-containing xonotlite crystal, and Da', Db' and Dc' are the dimensions of the crystallite-size in the planes of (400), (020) and (002) of the β-wollastonite crystal obtained by firing the crystal at 1,000° C. for three hours. Each of the dimensions (Da to Dc') can be determined by X-ray diffractiometry and calculation from the following equation (Scherrer's equation):

$$D = \frac{K\lambda}{\beta_{\frac{1}{2}} \cdot \cos\theta}$$

where:
D is the dimension in crystallite-size,
θ is diffraction angle,
K is 0.9, shape factor,
λ is 1.5418 Å, the wavelength of x-rays (target CuKα), and
$\beta_{\frac{1}{2}}$ is the half maximum line breadth of reflection plane.

Briefly stated, the index of crystallite antigrowth indicates the degree of difficulty with which the crystallites of β-wollastonite crystals grow when alumina-containing calcium silicate crystals are transformed into β-wollastonite crystals by being fired at 1,000° C. for 3 hours. Thus the index shows the degree of difficulty with which the size of the original crystals alter.

The term "initial breaking load" as used in the specification refers to the load applied to the globular shell-like secondary particle of alumina-containing calcium silicate crystals and just sufficient to at least partially crack the globular shell of the particle. Accordingly the initial breaking load of 10 g per particle means that when a progressively increasing load is applied to the secondary particle, the shell of the particle cracks at least partially under a load of 10 g. The initial breaking load can be determined by placing three secondary particles on a slide glass plate in an equilateral triangular arrangement, placing a covering glass plate on the particles and applying a gradually increasing load to the covering glass plate while observing the particles under an optical microscope to measure the load just sufficient to crack the shell of any one of the particles at least partially.

The apparent density of the secondary particles of this invention is measured by the following method. The water of a slurry of secondary particles is replaced by acetone, and the mixture of the particles and acetone is dried at 80° C. for 24 hours to obtain a powder without breaking the particles. A W g quantity of the powder is placed into a beaker, and water is applied to the secondary particles with a burette. When the particles have just been impregnated with water (i.e. when the viscosity of the secondary particles abruptly rises), the quantity of water applied, V ml, is measured. The apparent density is calculated from the following equation.

$$\text{Apparent density } \rho(g/cm^3) = \frac{W(g)}{V(ml) + \frac{W(g)}{\rho x}}$$

in which ρx is the true specific gravity of the alumina-containing calcium silicate crystals.

The secondary particles of alumina-containing calcium silicate crystals of this invention have the following characteristics.

(1) The alumina-containing calcium silicate crystals include alumina-containing xonotlite, alumina-containing tobermorite and like crystals. The alumina-containing calcium silicate crystal means one in which some of the constituent silicon atoms have been replaced by aluminum atoms. The amount of aluminum atoms substituting for silicon atoms in the alumina-containing calcium silicate crystal is such that the ratio of silicon atoms to aluminum atoms at least 5:1. While alumina-containing calcium silicate crystals are prepared by subjecting a siliceous material, lime material and alumina material to hydrothermal reaction, the mixture of the starting materials, if containing alumina in excess of a certain amount, will not afford alumina-containing calcium silicate crystals but give other crystals as of hydrogarnet, or the resulting calcium silicate crystals will contain a limited amount of alumina, permitting an excess of alumina to remain as such or in some other form. Such limit of the alumina contained in the starting mixture is usually about 8% by weight. When the starting mixture is subjected to hydrothermal reaction with its alumina content not exceeding the above limit, alumina-containing calcium silicate crystals are obtained. If the reaction product is placed into a mixture of 1 part by weight of concentrated hydrochloric acid and 1 part by weight of distilled water and the resulting insolubles are subjected to X-ray diffraction, no X-ray peak will be observed for the alumina component of the starting mixture used. Furthermore, X-ray diffraction of the product will reveal a peak for calcium silicate crystals only. This means that the alumina material in the starting mixture has been incorporated into the calcium silicate crystals as a component thereof. The alumina content of the product can be determined by placing the reaction product into hydrochloric acid, collecting the resulting precipitate by filtration, placing the precipitate into an aqueous solution of sodium hydroxide, filtering the mixture and chemically analyzing the filtrate obtained.

Such alumina-containing calcium silicate crystals afford alumina-containing calcium silicate shaped bodies having the peculiar secondary structure to be described later, an extremely low density and high strength, retaining remarkably enhanced residual strength when fired at 1,000° C. and exhibiting a greatly reduced linear shrinkage on drying. It is noteworthy that even when a siliceous material having a relatively high alumina content is used for the preparation of alumina-containing calcium silicate crystals with an alumina content of 1 to 8% by weight, the crystals have an index of crystallite antigrowth of less than 8 and give a shaped body which fails to exhibit noticeably enhanced residual strength when fired at 1,000° C. Thus, only when an alumina material is used in combination with a siliceous material and lime material although siliceous materials usually contain an amount of alumina, the resulting alumina-containing calcium silicate crystals have an index of crystallite antigrowth of at least 8.

(2) The alumina-containing calcium silicate crystals useful in this invention are at least 8 in the index of crystallite antigrowth. Because of this feature, the secondary particles of such crystals can be fired with deformation effectively inhibited and therefore provide shaped bodies having greatly improved thermal stability, namely outstanding residual strength.

Figure 3:
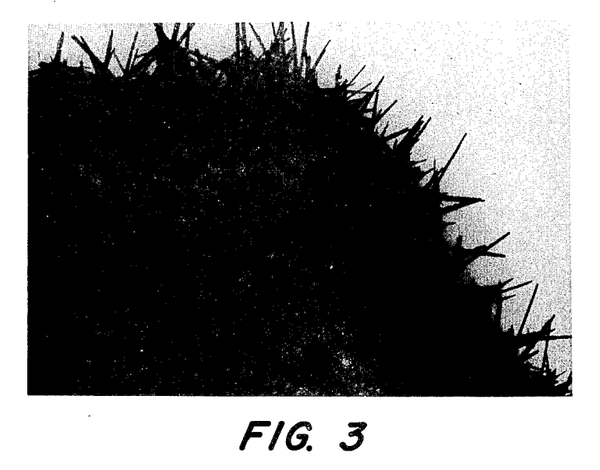
FIG. 3 is an electron photomicrograph showing the same particles at a magnification of 15000×.
Figure 4:
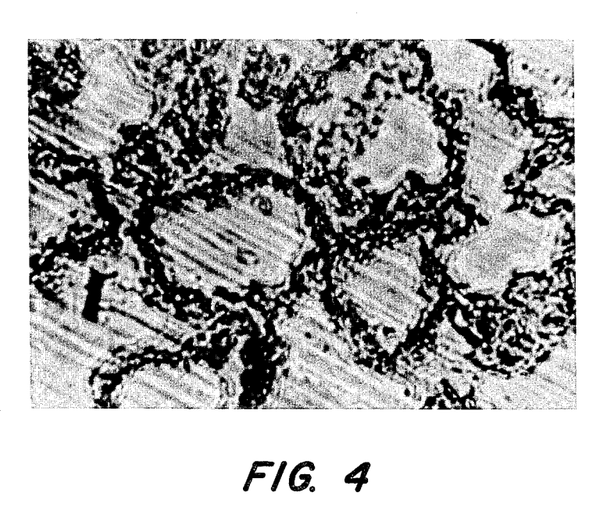
FIG. 4 is an optical photomicrograph taken at a magnification of 1100× showing a slice specimen prepared by embedding the same particles in a synthetic resin piece and microtoming the piece.

(3) Observations under an electron microscope and an optical microscope reveal that the secondary particles are in the form of globular shells about 5 to about 70 μm in outside diameter and made up of three-dimensionally interlocked calcium silicate crystals, at least 80% of the particles being 10 to 60 μm in outside diameter. The term "globular shell" is not used in a strict sense but means that the particle appears globular or spherical and has a hollow interior. The globular shell may have projections or indentations over part of its surface. The above appearance and outside diameter will be apparent from FIG. 1 which is an optical photomicrograph taken at a magnification of 400× and showing secondary particles of Example 1 according to the invention. The hollow shell structure will be apparent from FIG. 2 which is a scanning electron photomicrograph taken at a magnification of 3,000× and showing the same secondary particles as above. Furthermore FIG. 2 and FIG. 3 (electron photomicrograph at 15,000×) show that the secondary particles have an outer shell portion composed of needlelike crystals of alumina-containing calcium silicate as closely three-dimensionally interlocked with one another. FIG. 4 is an optical photomicrograph taken at a magnification of 1,100× and showing a slice specimen prepared by embedding such secondary particles in a synthetic resin place and microtoming the piece. It is seen that the shells of the secondary particles are about 1 to about 25 $\mu$m in thickness.

(4) The secondary particles of this invention are up to about 0.13 g/cm$^3$, primarily in the range of 0.03 to 0.13 g/cm$^3$, in apparent density and are extremely light.

(5) The secondary particles of this invention are at least 10 g per particle in initial breaking load and are characterized by exceedingly high plasticity such that they are compressed to a flat shape free of any cracking even when subjected to a load of 20 g. It appears that the initial breaking load relates to the structure of the secondary particles, especially to the density of alumina-containing calcium silicate crystals forming the outer shell portion, as well as to the outside diameter and the apparent density of the particles. The shaped bodies prepared from these secondary particles with such high resistance to deformation have the feature that they retain extremely high residual strength when fired at a temperature of not lower than 1,000° C.

(6) An analysis with use of a thermobalance indicates that the secondary particles have an ignition loss of up to about 10%.

The alumina-containing calcium silicate shaped bodies of this invention will now be described. The shaped bodies are composed of secondary particles of alumina-containing calcium silicate crystals joined to one another as compressed and deformed by the pressure applied for shaping. Because of this structure, the globular shell-like form peculiar to the secondary particles and the unique characteristics of the component alumina-containing calcium silicate crystals, the shaped bodies have the features of possessing an extremely low density and high strength, exhibiting greatly reduced linear shrinkage when fired at 1,000° C. and retaining outstanding residual strength.

The aqueous slurries of alumina-containing calcium silicate crystals of this invention comprise secondary particles of this invention as uniformly dispersed in water. The amount of water is usually at least 15 times, preferably at least 18 times, the amount of the solids. The aqueous slurries, when shaped and dried, afford shaped bodies made up of alumina-containing calcium silicate crystals.

The secondary particles of alumina-containing calcium silicate crystals of this invention are prepared by the following process.

An amorphous siliceous material containing Na$_2$O and/or K$_2$O in a total amount of at least 0.5% by weight is admixed with a lime material and water to obtain a slurry in which 50% of the particles are up to 7 $\mu$m in diameter. An alumina material is admixed with the slurry to obtain a starting slurry containing water in an amount of at least 15 times the weight of the solids of the starting slurry. The starting slurry is then subjected to hydrothermal reaction with application of pressure and heat and with stirring to prepare an aqueous slurry containing numerous globular shell-like secondary particles of this invention as dispersed in water. The aqueous slurry is dried without breaking the globular shell-like particles. Examples of useful lime materials are various and include quick lime. Also usable are slaked lime and carbide slug, but quick lime is most preferable. Useful siliceous materials are amorphous siliceous materials having an average particle size of up to 10 $\mu$m and containing Na$_2$O and/or K$_2$O in a total amount of at least 0.5% by weight. Such materials preferably contain at least 75% by weight of SiO$_2$. The Na$_2$O and K$_2$O contents can be determined by chemical analysis. Exemplary of useful siliceous materials is amorphous silica, namely so-called silicon dust or silica dust, resulting in large quantities from the production of metallic silicon or ferrosilicon as a by product. Silicon dust or silica dust is usually about 0.05 to 0.5 $\mu$m in average particle size, and is found to be amorphous or vitreous by X-ray diffraction. Chemical analysis of this material reveals that it comprises 0 to 7% by weight of ignition loss, 80 to 99% by weight of SiO$_2$, 0 to 4% by weight of Al$_2$O$_3$, and 0.5 to 4% by weight of Na$_2$O and/or K$_2$O. Silicon dust or silica dust, which is a by-product, is relatively inexpensive and is one of preferable siliceous materials. Our research has shown that when silicon dust or silica dust containing at least about 0.5% by weight, preferably about 0.5 to about 4% by weight, of Na$_2$O and/or K$_2$O is used, additional use of a specified amount of an alumina-containing material in combination therewith imparts the resulting product higher strength after heating at 1,000° C. than when the alumina-containing material is not used. In the present invention only when having at least 0.5% by weight of Na$_2$O and/or K$_2$O, a siliceous material may contain a small amount of crystalline silica.

When milk of lime having a sedimentation volume of at least 5 ml is used as the lime material, the secondary particles obtained have a bulk density of about 0.03 to about 0.07 g/cm$^3$ and are exceedingly lightweight.

The sedimentation volume of milk of lime referred to in this specification is a value obtained by preparing 50 ml of milk of lime having a water to solids ratio by weight of 120:1, allowing the milk to stand for 20 minutes in a cylindrical container 1.3 cm in diameter and at least 50 cm$^3$ in capacity and measuring the volume (ml) of the resulting sediment of the particles of the lime. Thus a sedimentation volume of 5 ml means that the volume of such sediment is 5 ml, with 45 ml of a supernatant above the sediment in the container. Accordingly the value of the sedimentation volume is indicative of the degree of fineness of the lime particles in the water; the value, if large, indicates that the lime particles are very fine.

Alumina material useful in this invention are a wide variety of materials containing alumina. Typical of such materials are clays consisting primarily of at least one of minerals such as kaolinite, halloysite, hydrated halloysite, illite, pyrophyllite, dickite, sericite, attapulgite, etc.; mordenite, clinoptilolite, zeolite containing such minerals, etc.; alumina; etc.

The ratio of the lime material to the mixture of siliceous material and alumina material to be mixed therewith is suitalbe determined in accordance with the kind of the alumina-containing calcium silicate crystals desired. In the case of alumina-containing xonotlite, for example, the Ca/Si+Al atomic ratio is 0.80 to 1.3, preferably 0.85 to 1.1. The amount of alumina material to be used is about 1 to about 8% by weight, preferably about 1 to about 5% by weight, calculated as $Al_2O_3$ based on the combined amount of $SiO_2$ and CaO in the mixture. The staring slurry prepared contains water in an amount of at least 15 times, preferably at least 18 times, the amount of the solids contained in the slurry. Although larger proportions of water are in no way objectionable, the amount of water is usually 20 to 100 times the amount of the combined solids.

For the preparation of the starting slurry of this invention, the mixture of siliceous material, lime material and water must be so treated that the starting slurry obtained contains dispersed particles 50% of which are up to 7 μm in diameter. Such slurry can be prepared by adding water to the siliceous material and lime material in an amount at least equal to the amount of the solids of the materials by weight to prepare a slurry and treating the slurry, for example, with a fan turbine blade mixer (homomixer) equipped with a draft tube at about 8,000 r.p.m. or some other useful agitator. Alternatively the starting slurry can be prepared by treating a mixture of water and the siliceous material, for example, with the above-mentioned homomixer and admixing milk of lime with the treated mixture. These methods may be adopted in combination.

In this way the desired starting slurry can be prepared in which 50% by weight of the particles are up to 7 μm in diameter (hereinafter expressed as "particles at cumulative weight percent of 50%" are up to 7 μm in diameter). This expression indicates the dispersibility of solid particles in water. To obtain the desired slurry, solid particles are dispersed in varying amounts of water by various dispersing methods to prepare slurries each 1,000 ml in quantity and containing 35 g of solids, and the distribution of particle sizes in each of the slurries is measured according to the method of JIS A 1204-1970 to identify the slurry having the specified particle sizes. Particles of various materials generally tend to agglomerate into larger particles in water although this tendency varies with the kind and properties of the particles. For this reason, fine particles, when merely placed into water, usually will not provide a uniform slurry but agglomerate in the water, with the result that the particles at cumulative weight percent of 50% become larger in diameter. Slurries containing particles of such low dispersibility will present difficulty in the production of the shaped bodies contemplated by the invention, whereas such difficulty is avoidable for the production of the desired product with use of a slurry in which fine siliceous particles have been dispersed in water by high-speed or forced stirring as with a homomixer so that the particles at cumulative weight percent of 50% are up to 7 μm in diameter. Further according to this invention, all the solid particles of the siliceous material, lime material and alumina material in the slurry can be so adjusted that 50% by weight of the particles are up to 7 μm in diameter. If the dispersing procedure is conducted with use of an efficient agitator or under stricter conditions, the desired slurry can be obtained in a shorter period of time.

The starting slurry is then subjected to hydrothermal reaction with application of pressure and heat and with continuous or temporarily interrupted stirring. The starting slurry can be stirred by any of various methods insofar as the solids in the slurry can be hold dispersed uniformly in the aqueous medium. The slurry can be stirred, for example, with a mechanical device, air or liquid or by vibration. The reaction conditions such as pressure, stirring speed, etc. are suitably determined in accordance with the type of the reactor, stirring device and reaction product, etc. The preferred pressure is usually about 8 to 50 kg/cm$^2$, while the preferred temperature is about 175 to about 264° C. The reaction can be completed within a shorter period of time with an increase in the pressure. The hydrothermal reaction of the invention can be carried out continuously or batchwise. For continuous reaction, the starting slurry is continuously forced into the reactor while drawing off the reaction product (slurry of calcium silicate crystals) therefrom at atmospheric pressure. Precautions should be taken not to impair the secondary particles when they are drawn off. It is also possible to reduce the proportion of water in the starting slurry for reaction in the reactor and to run off the reaction product with a specified quantity of water added thereto.

For the preparation of the alumina-containing calcium silicate, it is possible to use a reaction accelerator, catalyst and inorganic fibers such as asbestos, ceramic fiber, alkali-resistant glass fiber, etc.

The hydrothermal reaction gives a slurry in which numerous secondary particles of alumina-containing calcium silicate crystals are dispersed in water. When dried without impairing the shape of the secondary particles, the slurry affords secondary particles of super-lightweight alumina-containing calcium silicate of this invention.

The secondary particles of this invention thus obtained can be readily dispersed or suspended in water without impairing the structure thereof to prepare a slurry.

According to this invention, shaped bodies can be produced by shaping and drying a slurry comprising numerous secondary particles of alumina-containing calcium silicate crystals as dispersed in water and thus prepared. With this invention, it is also possible to produce shaped bodies by shaping a mass of alumina-containing calcium silicate secondary particles of this invention as wetted with water and drying the shaped mass. In the former case, although the proportion of water is variable over a wide range, water is used usually in an amount about 15 to about 100 times the amount of the solids by weight. In the latter case, an amount of water is about 3 to about 14 times the amount of the solids by weight.

When desired, various reinforcing materials can be incorporated into the aqueous slurry of secondary particles or the wet mass of secondary particles. A wide variety of reinforcing materials are usable, including inorganic fibers such as asbestos, rock wool, glass fiber, ceramic fiber, carbon fiber, metallic fiber, etc. and organic fibers such as pulp, hemp, rayon, polyacrylonitrile, polyporpylene, wood fiber, polyamide, polyester, etc. These fibrous materials impart greatly enhanced mechanical strength to the shaped body. Cements, gypsum, starch, binder of the phosphoric acid or water glass type, etc. are usuable for reducing or eliminating the shrinkage of the wet shaped mass during drying or for adding to the surface strength of the shaped body.

Metal nets, metal wires or rods, etc. can also be incorporated into the shaped body. According to this invention, the aqueous slurry or wet mass of secondary particles can be made into shaped bodies as by injection molding, dewatering with a press or rolls, sheet making and extrusion.

The globular secondary particles of this invention have an extremely low apparent density and high resistance to heat. Suspensions of these particles in water or solutions can be easily made into shaped bodies, which are very useful as refractory building materials and heat-insulating materials. The secondary particles, as such or as suitably shaped, are also usable as fillers, adsorbents, deodorants, pigments, carriers for catalysts and for various chemicals. They are further useful for agricultural chemicals, coating compositions, tooth powders, etc.

The features of this invention will be described below in greater detail with reference to examples, in which the parts or percentages are all by weight unless otherwise specified.

EXAMPLE 1

Figure 7:
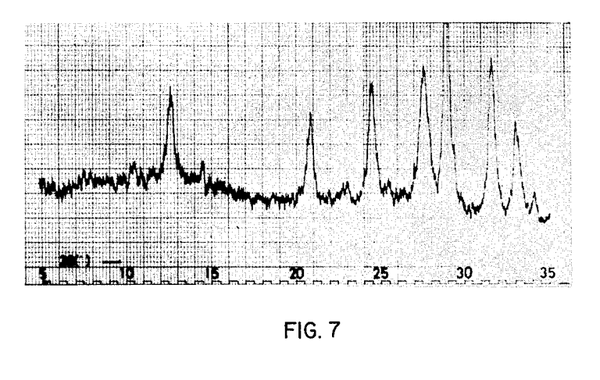
FIG. 7 is an X-ray diffraction pattern of secondary particles of this invention.

Quick lime (43.3 parts, containing 95.2% of CaO) is slaked in hot water at 80° C., and 45.8 parts of ferrosilicon dust 0.23 μm in average particle size (containing 92.3% of $SiO_2$, 0.1% of $Al_2O_3$, 1.20% of $K_2O$ and 0.54% of $Na_2O$) is added to the mixture. The resulting mixture is treated in a homomixer for 20 minutes to disperse the solids in water and obtain a slurry (the particles at cumulative weight percent of 50% are 5.2 μm in diameter). To the slurry are added 10.9 parts of clay (containing 49.6% of $SiO_2$ and 28.0% of $Al_2O_3$) consisting primarily of halloysite and kaolinite and water to obtain a starting slurry (Ca/Si+Al atomic ratio: 0.86) containing water in 24 times the amount by weight of the solids. The starting slurry is subjected to hydrothermal reaction at saturated water vapor pressure of 12 kg/cm² at a temperature of 191° C. for 8 hours in an autoclave having an inside diameter of 15 cm, with a stirrer blade driven at 540 r.p.m. to obtain a slurry of crystals. The slurry is dried at 105° C. for 24 hours and thereafter subjected to X-ray diffraction. The diffraction pattern, shown as FIG. 7, reveals no diffraction peak for the clay used as a material but indicates diffraction peaks for xonotlite crystals only (at d=1.8455, 1.5259 and 2.3330 (Å)).

A quantity of the dried particles are decomposed with an aqueous solution of hydrochloric acid (1 part of conc. HCl and 1 part of water), and the resulting precipitate is filtered off. An aqueous solution of sodium hydroxide is added to the precipitate, and the mixture is filtered. The separate cake is dried and then subjected to X-ray diffraction, which reveals no diffraction peak for the clay. Chemical analysis of the filtrate gives 2.61% of $Al_2O_3$.

The above results of X-ray diffraction and chemical analysis show that some of the Si atoms in the xonotlite crystals formed by the hydrothermal reaction have been replaced by Al atoms in the clay, thus indicating that the crystals in the slurry are alumina-containing xonotlite crystals.

Figure 1:
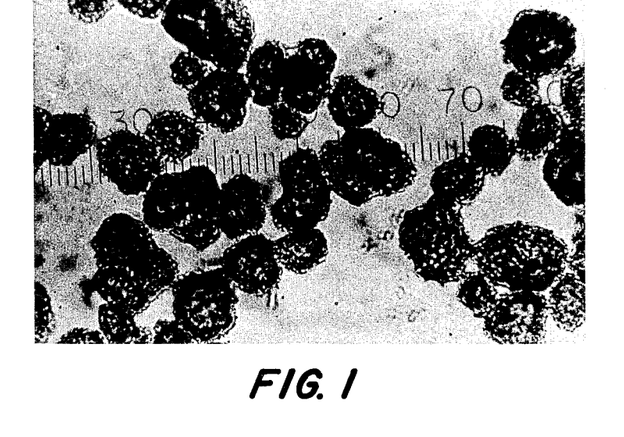
FIG. 1 is a photograph of secondary particles of this invention taken under an optical microscope at a magnification of 400×.

The same slurry of crystals as above is dried on slide glass and then photographed under an optical microscope at a magnification of 400X. The photograph reveals globular shell-like secondary particles 30 μm in average outside diameter as shown in FIG. 1. An observation of the particles by the reflection method reveals distinct contours and a substantially transparent interior.

Figure 2:
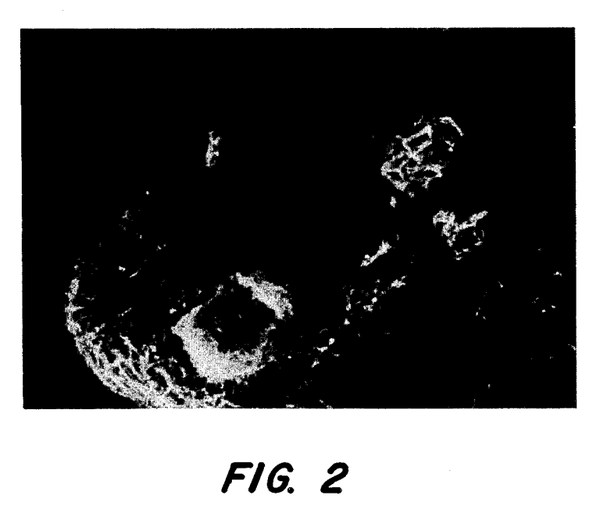
FIG. 2 is a scanning electrom photomicrograph showing the same particles at a magnification of 3000×.
Figure 5:
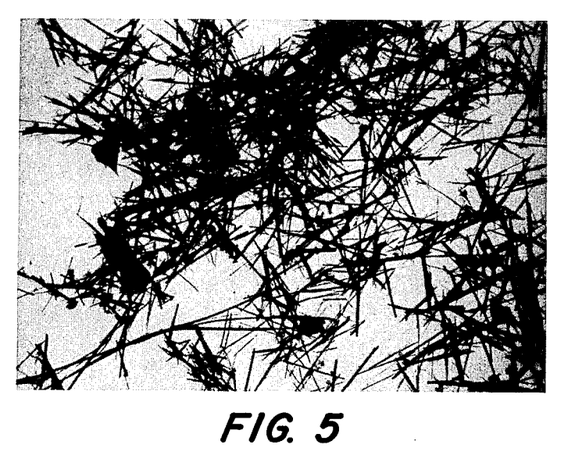
FIG. 5 is an electron photomicrograph at a magnification of 5000× showing alumina-containing xonotlite crystals forming the secondary particles of the invention.
Figure 8:
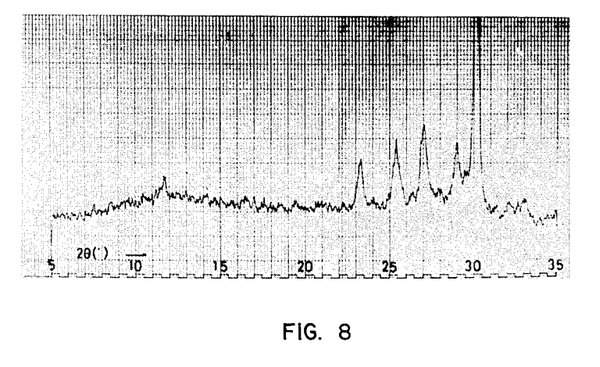
FIG. 8 is an X-ray diffraction pattern of secondary particles of this invention after said particles have been fired at 1000° C. for one hour.

An amount of the dry slurry of crystals is fixed with a mixture of methyl methacrylate, ethyl methacrylate and n-butyl methacrylate resins and then microtomed to a thickness of about 3 μm. The slice is photographed under an optical microscope at a magnification of 1,100×. FIG. 4 is the photograph, which shows that the globular shells of particles have a thickness of 1 to 25 μm, an average thickness of 3.8 μm and an interior a major portion of which is hollow. When observed under an electron microscope at a magnification of 15,000× as shown in FIG. 3, the shells are found to have numerous whiskers of alumina-containing xonotlite crystals on the surface. Further when observed under a scanning electron microscope as seen in FIG. 2 (3,000×), the globular shells are found to have a hollow interior and to be made up of a large number of alumina-containing xonotlite crystals three-dimensionally interlocked with one another, FIG. 5 shows some of the alumina-containing xonotlite crystals (primary particles) forming the secondary particles as observed under an electron microscope at a magnification of 5,000×. It is seen that the crystals are needlelike and about 1 to about 20 μm in length and about 0.05 to about 1.0 μm in width. A differential thermal analysis of the crystals reveals hardly any peak, while an analysis with use of a thermo-balance shows a reduction at 750° to 820° C. When such crystals are fired at 1,000° C. for 1 hour and then subjected to X-ray diffraction, the resulting diffraction pattern (FIG. 8) indicates that they are β-wollstonite crystals. An observation of the crystals under an electron microscope reveals exactly the same form as alumina-containing xonotlite crystals and an extinction contour-line.

Table 1 shows properties of the secondary particles.

TABLE 1

| Properties | Measurements |
| --- | --- |
| Average particle diameter (μm) | 30 |
| Apparent density of secondary particles (g/cm³) | 0.12 |
| Average shell thickness of secondary particles (μm) | 3.8 |
| Initial breaking load on secondary particles | Flattened but free of breaking under load of 10 g/particle or higher |
| Index of crystallite antigrowth | 21 |
| Ignition loss (%) | 6.5 |
| True specific gravity of crystals at 22° C. | 2.70 |

Figure 6:
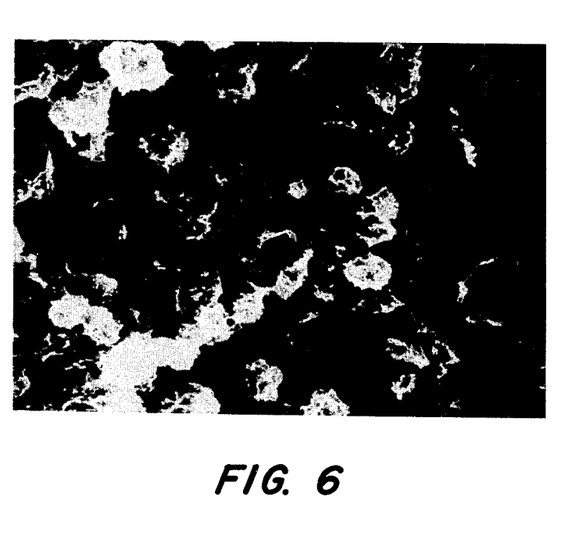
FIG. 6 is a scanning electron photomicrograph taken at a magnification of 600× showing a fractured surface of the shaped body of the invention.

With 90 parts (calculated as solids) of the same slurry of crystals as above are admixed 4 parts of glass fiber, 3 parts of portland cement and 3 parts of pulp, and the mixture is shaped under pressure by a press and then dried at 120° C. for 20 hours to obtain a shaped body I. The same procedure as above is repeated except that a different pressure is applied to the mixture to obtain a shaped body II. FIG. 6 is a scanning electron photomicrograph taken at a magnification of 600× and showing a fractured surface of the shaped body I. The shaped bodies are impregnated with the same mixture of resins as used above and microtomed to a thickness of about 3 μm, and the slices are observed under optical and electron microscopes, with the result that the particles are found identical with those of the slurry of crystals in average particle size and shell thickness. Table 2 shows properties of these shaped bodies.

TABLE 2

| Properties | Specimen No. I | Specimen No. II |
|---|---|---|
| Density (g/cm$^3$) | 0.098 | 0.205 |
| Bending strength (kg/cm$^2$) | 9.3 | 32.5 |
| Specific strength | 94.9 | 158.5 |
| Linear shrinkage on drying (%) | 0.31 | 0.22 |

The properties listed above are measured by the following methods.

Bending strength: According to JIS A 9510.
Specific strength: Given by $\frac{\text{bending strength}}{\text{density}}$ The specimens exhibit the properties shown in Table 3 when baked at 1,000° C. for 3 hours.

TABLE 3

| Properties | Specimen No. I | Specimen No. II |
|---|---|---|
| Density (g/cm$^3$) | 0.095 | 0.201 |
| Bending strength (kg/cm$^2$) | 6.2 | 22.6 |
| Specific strength | 65.3 | 112.4 |
| Linear shrinkage on heating (%) | 0.81 | 0.76 |
| Residual strength (%) | 66.7 | 69.5 |

The residual strength is calculated from the following equation:

$$\text{Residual strength (\%)} = \frac{\text{Bending strength after baking}}{\text{Bending strength before baking}} \times 100$$

EXAMPLE 2

Quick lime (47.0 parts, containing 95.5% of CaO) is slaked in hot water at 80° C., and 21.9 parts of ferrosilicon dust 0.24 μm in average particle size (containing 92.5% of SiO$_2$, 0.2% of Al$_2$O$_3$, 1.33% of K$_2$O and 0.62% of Na$_2$O) is added to the mixture. The resulting mixture is treated in a homomixer for 20 minutes to disperse the solids in water and obtain a slurry (the particles at cumulative weight percent of 50% are 4.8 μm in diameter). To the slurry are added 31.1 parts of clay (containing 68.1% of SiO$_2$ and 20.8% of Al$_2$O$_3$) consisting primarily of illite and kaolinite and water to obtain a starting slurry (Ca/Si+Al atomic ratio: 0.98) containing water in 24 times the amount by weight of the solids. The starting slurry is subjected to hydrothermal reaction at saturated water vapor pressure of 12 kg/cm$^2$ at a temperature of 191° C. for 8 hours in the same autoclave as used in Example 1, with a stirrer blade driven at 112 r.p.m. to obtain a slurry of crystals. The slurry is dried at 105° C. for 24 hours and thereafter analyzed in the same manner as in Example 1, with the result that the crystals are alumina-containing xonotlite crystals and alumina-containing tobermorite crystals mixed therewith. Subsequently the slurry is treated in the same manner as in Example 1 to obtain secondary particles with the properties shown in Table 4 below.

TABLE 4

| Properties | Measurements |
|---|---|
| Average particle diameter (μm) | 36 |
| Apparent density of secondary particles (g/cm$^3$) | 0.112 |
| Average shell thickness of secondary particles (μm) | 3.8 |
| Initial breaking load on secondary particles | Flattened but free of breaking under load of 10 g/particle or higher |
| Index of crystallite antigrowth | 18 |
| Ignition loss (%) | 8.8 |
| True specific gravity of crystals at 22° C. | 2.66 |

With 90 parts (calculated as solids) of the same slurry of crystals as above are admixed 4 parts of glass fiber, 3 parts of portland cement and 3 parts of pulp, and the mixture is shaped under pressure by a press and then dried at 120° C. for 20 hours to obtain a shaped body I. The same procedure as above is repeated except that a different pressure is applied to the mixture to obtain a shaped body II. Table 5 shows properties of these shaped bodies.

TABLE 5

| Properties | Specimen No. I | Specimen No. II |
|---|---|---|
| Density (g/cm$^3$) | 0.107 | 0.199 |
| Bending strength (kg/cm$^3$) | 4.7 | 18.1 |
| Specific strength | 43.9 | 91.0 |
| Linear shrinkage on drying (%) | 0.41 | 0.10 |

The shaped bodies exhibit the properties shown in Table 6 below when baked at 1,000° C. for 3 hours.

TABLE 6

| Properties | Specimen No. I | Specimen No. II |
|---|---|---|
| Density (g/cm$^3$) | 0.104 | 0.195 |
| Bending strength (kg/cm$^2$) | 3.0 | 11.6 |
| Specific strength | 28.8 | 59.5 |
| Linear shrinkage on heating (%) | 0.90 | 0.67 |
| Residual strength (%) | 63.8 | 64.1 |

EXAMPLE 3

Quick lime (47.0 parts, containing 95.5% of CaO) is slaked in hot water at 80° C., and 33.7 parts of ferrosilicon dust 0.24 μm in average particle size (containing 92.5% of SiO$_2$, 0.2% of Al$_2$O$_3$, 1.33% of K$_2$O and 0.62% of Na$_2$O) is added to the mixture. The resulting mixture is treated in a homomixer for 20 minutes to disperse the solids in water and obtain a slurry (the particles at cumulative weight percent of 50% are 5.4 μm in diameter). To the slurry are added 19.3 parts of clay (containing 68.1% of SiO$_2$ and 20.8% of Al$_2$O$_3$) consisting primarily of illite and kaolinite and water to obtain a starting slurry (Ca/Si+Al atomic ratio: 0.98) containing water in 24 times the amount by weight of the solids. The starting slurry is subjected to hydrothermal reaction at saturated water vapor pressure of 12 kg/cm$^2$ at a temperature of 191° C. for 8 hours in the same autoclave as used in Example 1, with a stirrer blade driven at 112 r.p.m. to obtain a slurry of crystals. The slurry is dried at 105° C. for 24 hours and thereafter analyzed in the same manner as in Example 1, with the result that the crystals are alumina-containing xonotlite crystals and a small amount of alumina-containing tobermorite crystals mixed therewith. Subsequently the slurry is treated in the same manner as in Example 1 to obtain secondary particles with the properties shown in Table 7 below.

TABLE 7

| Properties | Measurements |
| --- | --- |
| Average particle diameter (μm) | 31 |
| Apparent density of secondary particles (g/cm³) | 0.124 |
| Average shell thickness of secondary particles (μm) | 3.7 |
| Initial breaking load on secondary particles | Flattened but free of breaking under load of 10 g/particle or higher |
| Index of crystallite antigrowth | 24.5 |
| Ignition loss (%) | 7.3 |
| True specific gravity of crystals at 22° C. | 2.69 |

With 90 parts (calculated as solids) of the same slurry of crystals as above are admixed 4 parts of glass fiber, 3 parts of portland cement and 3 parts of pulp, and the mixture is shaped under pressure by a press and then dried at 120° C. for 20 hours to obtain a shaped body I. The same procedure as above is repeated except that a different pressure is applied to the mixture to obtain a shaped body II. Table 8 shows properties of these shaped bodies.

TABLE 8

| | Specimen No. | |
| --- | --- | --- |
| Properties | I | II |
| Density (g/m³) | 0.101 | 0.203 |
| Bending strength (kg/cm²) | 8.1 | 27.3 |
| Specific strength | 80.2 | 134.5 |
| Linear shrinkage on drying (%) | 0.31 | 0.12 |

The shaped bodies exhibit the properties shown in Table 9 below when baked at 1,000° C. for 3 hours.

TABLE 9

| | Specimen No. | |
| --- | --- | --- |
| Properties | I | II |
| Density (g/cm³) | 0.097 | 0.198 |
| Bending strength (kg/cm²) | 5.3 | 17.2 |
| Specific strength | 54.6 | 86.9 |
| Linear shrinkage on heating (%) | 0.84 | 0.71 |
| Residual strength (%) | 65.4 | 63.0 |

EXAMPLE 4

Quick lime (47.0 parts, containing 95.5% of CaO) is slaked in hot water at 80° C., and 44.2 parts of ferrosilicon dust 0.24 μm in average particle size (containing 92.5% of $SiO_2$, 0.2% of $Al_2O_3$, 1.33% of $K_2O$ and 0.62% of $Na_2O$) is added to the mixture. The resulting mixture is treated in a homomixer for 20 minutes to disperse the solids in water and obtain a slurry (the particles at cumulative weight percent of 50% are 5.0 μm in diameter). To the slurry are added 8.8 parts of clay (containing 68.1% of $SiO_2$ and 20.8% of $Al_2O_3$) consisting primarily of illite and kaolinite and water to obtain a starting slurry (Ca/Si+Al atomic ratio: 0.98) containing water in 24 times the amount by weight of the solids. The starting slurry is subjected to hydrothermal reaction at saturated water vapor pressure of 12 kg/cm² at a temperature of 191° C. for 8 hours in the same autoclave as used in Example 1, with a stirrer blade driven at 112 r.p.m. to obtain a slurry of crystals. The slurry is dried at 105° C. for 24 hours and thereafter analyzed in the same manner as in Example 1, with the result that the crystals are alumina-containing xonotlite crystals. Subsequently the slurry is treated in the same manner as in Example 1 to obtain secondary particles with the properties shown in Table 10 below.

TABLE 10

| Properties | Measurements |
| --- | --- |
| Average particle diameter (μm) | 27 |
| Apparent density of secondary particles (g/cm³) | 0.121 |
| Average shell thickness of secondary paticles (μm) | 3.6 |
| Initial breaking load on secondary particles | Flattened but free of breaking under load of 10 g/particle or higher |
| Index of crystallite antigrowth | 17.5 |
| Ignition loss (%) | 6.1 |
| True specific gravity of crystals at 22° C. | 2.71 |

With 90 parts (calculated as solids) of the same slurry of crystals as above are admixed 4 parts of glass fiber, 3 parts of portland cement and 3 parts of pulp, and the mixture is shaped under pressure by a press and then dried at 120° C. for 20 hours to obtain a shaped body I. The same procedure as above is repeated except that a different pressure is applied to the mixture to obtain a shaped body II. Table 11 shows properties of these shaped bodies.

TABLE 11

| | Specimen No. | |
| --- | --- | --- |
| Properties | I | II |
| Density (g/cm³) | 0.102 | 0.203 |
| Bending strength (kg/cm²) | 9.4 | 32.2 |
| Specific strength | 92.2 | 158.6 |
| Linear shrinkage on drying (%) | 0.35 | 0.19 |

The shaped bodies exhibit the properties shown in Table 12 below when baked at 1,000° C. for 3 hours.

TABLE 12

| | Specimen No. | |
| --- | --- | --- |
| Properties | I | II |
| Density (g/cm³) | 0.099 | 0.197 |
| Bending strength (kg/cm²) | 6.3 | 21.9 |
| Specific strength | 63.6 | 111.2 |
| Linear shrinkage on heating (%) | 0.82 | 0.74 |
| Residual strength (%) | 67.0 | 68.0 |

EXAMPLE 5

Ferrosilicon dust 0.24 μm in average particle size (44.2 parts, containing 92.5% of $SiO_2$, 0.2% of $Al_2O_3$, 1.33% of $K_2O$ and 0.62% of $Na_2O$) is treated in a homomixer for 20 minutes to disperse the dust in water and obtain a slurry. To the slurry is added milk of lime prepared by slaking quick lime (47.0 parts, containing 95.5% of CaO) in water at 80° C. To the resulting mixture (the particles of cumulative weight percent of 50% are 4.7 μm in diameter) are added 8.8 parts of clay (containing 68.1% of $SiO_2$ and 20.8% of $Al_2O_3$) consisting primarily of illite and kaolinite and water to obtain a staring slurry (Ca/Si+Al atomic ratio: 0.98) containing water in 24 times the amount by weight of the solids. The starting slurry is subjected to hydrothermal reaction at saturated water vapor pressure of 12 kg/cm² at a temperature of 191° C. for 8 hours in the same autoclave as used in Example 1, with a stirrer blade driven at 112 r.p.m. to obtain a slurry of crystals. The slurry is dried at 105° C. for 24 hours and thereafter analyzed in the same manner as in Example 1, with the result that the crystals are alumina-containing xonotlite crystals. Subsequently the slurry is treated in the same manner as in Example 1 to obtain secondary particles with the properties shown in Table 13 below.

TABLE 13

| Properties | Measurements |
| --- | --- |
| Average particle diameter (μm) | 26 |
| Apparent density of secondary particles (g/cm³) | 0.120 |
| Average shell thickness of secondary particles (μm) | 3.6 |
| Initial breaking load on secondary particles | Flattened but free of breaking under load of 10 g/particle or higher |
| Index of crystallite antigrowth | 17 |
| Ignition loss (%) | 5.7 |
| True specific gravity of crystals at 22° C. | 2.71 |

With 90 parts (calculated as solids) of the same slurry of crystals as above are admixed 4 parts of glass fiber, 3 parts of portland cement and 3 parts of pulp, and the mixture is shaped under pressure by a press and then dried at 120° C. for 20 hours to obtain a shaped body I. The same procedure as above is repeated except that a different pressure is applied to the mixture to obtain a shaped body II. Table 14 shows properties of these shaped bodies.

TABLE 14

| Properties | Specimen No. I | Specimen No. II |
| --- | --- | --- |
| Density (g/cm³) | 0.099 | 0.207 |
| Bending strength (kg/cm²) | 9.4 | 30.8 |
| Specific strength | 94.9 | 148.8 |
| Linear shrinkage on drying (%) | 0.34 | 0.18 |

The shaped bodies exhibit the properties shown in Table 15 below when baked at 1,000° C. for 3 hours.

TABLE 15

| Properties | Specimen No. I | Specimen No. II |
| --- | --- | --- |
| Density (g/cm³) | 0.096 | 0.201 |
| Bending strength (kg/cm²) | 6.2 | 21.6 |
| Specific strength | 64.6 | 107.5 |
| Linear shrinkage on heating (%) | 0.79 | 0.68 |
| Residual strength (%) | 66.0 | 70.1 |

EXAMPLE 6

Ferrosilicon dust 0.25 μm in average particle size (45.5 parts, containing 93.3% of $SiO_2$, 0.2% of $Al_2O_3$, 1.68% of $K_2O$ and 0.74% of $Na_2O$) is treated in a homo-mixer for 20 minutes to disperse the dust in water and obtain a slurry. To the slurry is added milk of lime prepared by slaking quick lime (45.9 parts, containing 95.5% of CaO) in water at 80° C. To the resulting mixture (the particles at cumulative weight percent of 50% are 6.9 μm in diameter) are added 6.6 parts of clay (containing 49.3% of $SiO_2$ and 27.5% of $Al_2O_3$) consisting primarily of halloysite and kaolinite, 2.0 parts of rock wool and water to obtain a starting slurry (Ca/Si+Al atomic ratio: 0.98) containing water in 24 times the amount by weight of the solids. The starting slurry is subjected to hydrothermal reaction at saturated water vapor pressure of 12 kg/cm² at a temperature of 191° C. for 8 hours in the same autoclave as used in Example 1, with a stirrer blade driven at 112 r.p.m. to obtain a slurry of crystals. The slurry is dried at 105° C. for 24 hours and thereafter analyzed in the same manner as in Example 1, with the result that the crystals are alumina-containing xonotlite crystals. An observation of the slurry of crystals under an optical microscope in the same manner as in Example 1 reveals globular secondary particles 27 μm in average outside diameter and partly joined to rock wool fiber. Subsequently the slurry is treated in the same manner as in Example 1 to obtain secondary particles with the properties shown in Table 16 below.

TABLE 16

| Properties | Measurements |
| --- | --- |
| Average particle diameter (μm) | 27 |
| Apparent density of secondary particles (g/cm³) | 0.118 |
| Average shell thickness of secondary particles (μm) | 3.5 |
| Initial breaking load on secondary particles | Flattened but free of breaking under load of 10 g/particle or higher |
| Index of crystallite antigrowth | 18 |
| Ignition loss (%) | 5.9 |
| True specific gravity of crystals at 22° C. | 2.72 |

With 92 parts (calculated as solids) of the same slurry of crystals as above are admixed 2 parts of glass fiber, 3 parts of portland cement and 3 parts of pulp, and the mixture is shaped under pressure by a press and then dried at 120° C. for 20 hours to obtain a shaped body I. The same procedure as above is repeated except that a different pressure is applied to the mixture to obtain a shaped body II. Table 17 shows properties of these shaped bodies.

TABLE 17

| Properties | Specimen No. I | Specimen No. II |
| --- | --- | --- |
| Density (g/cm³) | 0.097 | 0.198 |
| Bending strength (kg/cm²) | 9.7 | 33.9 |
| Specific strength | 100.0 | 171.2 |
| Linear shrinkage on drying (%) | 0.41 | 0.20 |

The shaped bodies exhibit the properties shown in Table 18 below when baked at 1,000° C. for 3 hours.

TABLE 18

| Properties | Specimen No. I | Specimen No. II |
| --- | --- | --- |
| Density (g/cm³) | 0.094 | 0.195 |
| Bending strength (kg/cm²) | 6.5 | 23.8 |
| Specific strength | 69.1 | 122.1 |
| Linear shrinkage on heating (%) | 0.83 | 0.70 |
| Residual strength (%) | 67.0 | 70.2 |

EXAMPLE 7

Ferrosilicon dust 0.24 μm in average particle size (47.0 parts, containing 92.5% of $SiO_2$, 0.2% of $Al_2O_3$, 1.33% of K₂O and 0.62% of Na₂O) is treated in a homomixer for 20 minutes to disperse the dust in water and obtain a slurry. To the slurry is added milk of lime prepared by slaking quick lime (47.0 parts, containing 95.5% of CaO) in water at 80° C. To the resulting mixture (the particles at cumulative weight of 50% are 5.2 μm in diameter) are added 4.5 parts of clay (containing 68.1% of $SiO_2$ and 20.8% of $Al_2O_3$) consisting primarily of illite and kaolinite and water to obtain a starting slurry (Ca/Si+Al atomic ratio: 0.98) containing water in 24 times the amount by weight of the solids. The starting slurry is subjected to hydrothermal reaction at saturated water vapor pressure of 12 kg/cm² at a temperature of 191° C. for 8 hours in the same autoclave as used in Example 1, with a stirrer blade driven at 112 r.p.m. to obtain a slurry of crystals. The slurry is dried at 105° C. for 24 hours and thereafter analyzed in the same manner as in Example 1, with the result that the crystals are alumina-containing xonotlite crystals. Subsequently the slurry is treated in the same manner as in Example 1 to obtain secondary particles with the properties shown in Table 19 below.

TABLE 19

| Properties | Measurements |
| --- | --- |
| Average particle diameter (μm) | 29 |
| Apparent density of secondary particles (g/cm³) | 0.109 |
| Average shell thickness of secondary particles (μm) | 3.6 |
| Initial breaking load on secondary particles | Flattened but free of breaking under load of 10 g/particle or higher |
| Index of crystallite antigrowth | 17 |
| Ignition loss (%) | 6.0 |
| True specific gravity of crystals at 22° C. | 2.74 |

With 90 parts (calculated as solids) of the same slurry of crystals as above are admixed 4 parts of glass fiber, 3 parts of portland cement and 3 parts of pulp, and the mixture is shaped under pressure by a press and then dried at 120° C. for 20 hours to obtain a shaped body I. The same procedure as above is repeated except that a different pressure is applied to the mixture to obtain a shaped body II. Table 20 shows properties of these shaped bodies.

TABLE 20

| Properties | Specimen No. I | Specimen No. II |
| --- | --- | --- |
| Density (g/cm³) | 0.103 | 0.202 |
| Bending strength (kg/cm²) | 8.9 | 29.8 |
| Specific strength | 86.4 | 147.5 |
| Linear shrinkage on drying (%) | 0.33 | 0.21 |

The shaped bodies exhibit the properties shown in Table 21 below when baked at 1,000° C. for 3 hours.

TABLE 21

| Properties | Specimen No. I | Specimen No. II |
| --- | --- | --- |
| Density (g/cm³) | 0.100 | 0.198 |
| Bending strength (kg/cm²) | 5.8 | 19.1 |
| Specific strength | 58.0 | 96.5 |
| Linear shrinkage on heating (%) | 0.89 | 0.73 |
| Residual strength (%) | 65.2 | 64.1 |

EXAMPLE 8

Quick lime (47.0 parts, containing 95.5% of CaO) is slaked in hot water at 80° C. and treated in a homomixer for 3 minutes in water to obtain a milk of lime having a sedimentation volume of 17 ml. 43 parts of ferrosilicon dust 0.24 μm in average particle size (containing 92.5% of $SiO_2$, 0.2% $Al_2O_3$, 1.33% of K₂O and 0.62% of Na₂O) is treated in a homomixer for 20 minutes to disperse the dust in water to obtain a dispersion. The milk of lime is added to the dispersion to produce a slurry (the particles at cumulative weight percent of 50% are 4.0 μm in diameter). To the slurry are added 6.7 parts of clay (containing 68.1% of $SiO_2$ and 20.8% of $Al_2O_3$) consisting primarily of illite and kaolinite and water to obtain a starting slurry (Ca/Si+Al atomic ratio: 0.98) containing water in 50 times the amount by weight of the solids. The starting slurry is subjected to hydrothermal reaction at saturated water vapor pressure of 12 kg/cm² at a temperature of 191° C. for 8 hours in the same autoclave as used in Example 1, with a stirrer blade driven at 112 r.p.m. to obtain a slurry of crystals. The slurry is dried at 105° C. for 24 hours and thereafter analyzed in the same manner as in Example 1, with the result that the crystals are alumina-containing xonotlite crystals. Subsequently the slurry is treated in the same manner as in Example 1 to obtain secondary particles with the properties shown in Table 22 below.

TABLE 22

| Properties | Measurements |
| --- | --- |
| Average particle diameter (μm) | 28 |
| Apparent density of secondary particles (g/cm³) | 0.054 |
| Average shell thickness of secondary particles (μm) | 2.3 |
| Initial breaking load on secondary particles | Flattened but free of breaking under load of 10 g/particle or higher |
| Index of crystallite antigrowth | 18 |
| Ignition loss (%) | 5.8 |
| True specific gravity of crystals at 22° C. | 2.73 |

With 88 parts (calculated as solids) of the same slurry of crystals as above are admixed 5 parts of glass fiber, 3 parts of portland cement and 4 parts of pulp, and the mixture is shaped under pressure by a press and then dried at 120° C. for 20 hours to obtain a shaped body I. The same procedure as above is repeated except that a different pressure is applied to the mixture to obtain a shaped body II. Table 23 shows properties of these shaped bodies.

TABLE 23

| Properties | Specimen No. I | Specimen No. II |
| --- | --- | --- |
| Density (g/cm³) | 0.056 | 0.084 |
| Bending strength (kg/cm²) | 3.1 | 8.9 |
| Specific strength | 55.4 | 106.0 |
| Linear shrinkage on drying (%) | 0.37 | 0.18 |

The shaped bodies exhibit the properties shown in Table 24 below when baked at 1,000° C. for 3 hours.

TABLE 24

| Properties | Specimen No. I | Specimen No. II |
| --- | --- | --- |
| Density (g/cm³) | 0.052 | 0.080 |
| Bending strength (kg/cm²) | 2.0 | 5.8 |
| Specific strength | 38.5 | 72.5 |
| Linear shrinkage on heating (%) | 0.87 | 0.71 |
| Residual strength (%) | 64.5 | 65.2 |

COMPARISON EXAMPLE 1

Quick lime (47.0 parts, containing 95.5% of CaO) is slaked in hot water at 80° C., and 53.0 parts of ferrosilicon dust 0.24 μm in average particle size (containing 92.5% of $SiO_2$, 0.2% of $Al_2O_3$, 1.33% of $K_2O$ and 0.62% of $Na_2O$) is treated in a homomixer for 20 minutes in water to produce a dispersion. Then the resulting dispersion is mixed with the above slaked lime to obtain a slurry (the particles at cumulative weight percent of 50% are 4.8 μm in diameter). Subsequently water is added to the slurry to obtain a starting slurry, which is subjected to hydrothermal reaction at saturated water vapor pressure of 12 kg/cm² at a temperature of 191° C. for 8 hours in the same autoclave as used in Example 1, with a stirrer blade driven at 112 r.p.m. to obtain a slurry of crystals. The slurry is dried at 105° C. for 24 hours and thereafter analyzed in the same manner as in Example 1, with the result that the crystals are found to be xonotlite crystals (having diffraction peaks at 1.8410, 1.5229 and 2.3406 (Å)). Subsequently the slurry is treated in the same manner as in Example 1 to obtain secondary particles with the properties shown in Table 25 below.

TABLE 25

| Properties | Measurements |
| --- | --- |
| Average particle diameter (μm) | 26 |
| Apparent density of secondary particles (g/cm³) | 0.122 |
| Average shell thickness of secondary particles (μm) | 3.6 |
| Initial breaking load on secondary particles | Flattened but free of breaking under load of 10 g/particles or higher |
| Index of crystallite antigrowth | 2.5 |
| Ignition loss (%) | 5.8 |
| True specific gravity of crystals at 22° C. | 2.76 |

With 90 parts (calculated as solids) of the same slurry of crystals as above are admixed 4 parts of glass fiber, 3 parts of portland cement and 3 parts of pulp, and the mixture is shaped under pressure by a press and then dried at 120° C. for 20 hours to obtain a shaped body I. The same procedure as above is repeated except that a different pressure is applied to the mixture to obtain a shaped body II. Table 26 shows properties of these shaped bodies.

TABLE 26

| Properties | Specimen No. I | Specimen No. II |
| --- | --- | --- |
| Density (g/cm³) | 0.107 | 0.206 |
| Bending strength (kg/cm²) | 4.2 | 15.4 |
| Specific strength | 39.3 | 74.8 |
| Linear shrinkage on drying (%) | 0.41 | 0.17 |

The shaped bodies exhibit the properties shown in Table 27 below when baked at 1,000° C. for 3 hours.

TABLE 27

| Properties | Specimen No. I | Specimen No. II |
| --- | --- | --- |
| Density (g/cm³) | 0.103 | 0.200 |
| Bending strength (kg/cm²) | 1.4 | 5.0 |
| Specific strength | 13.6 | 25.0 |
| Linear shrinkage on heating (%) | 1.20 | 0.99 |
| Residual strength (%) | 33.3 | 32.5 |

COMPARISON EXAMPLE 2

Quick lime (47.0 parts, containing 95.5% of CaO) is slaked in hot water at 80° C., and 44.2 parts of ferrosilicon dust 0.24 μm in average particle size (containing 92.5% of $SiO_2$, 0.2% of $Al_2O_3$, 1.33% of $K_2O$ and 0.62% of $Na_2O$) is added to the mixture to obtain a slurry (the particles at cumulative weight percent of 50% are 8.2 μm in diameter). To the slurry are added 8.8 parts of clay (containing 68.1% of $SiO_2$ and 20.8% of $Al_2O_3$) consisting primarily of illite and kaolinite and water to obtain a starting slurry (Ca/Si+Al atomic ratio: 0.98) containing water in 24 times the amount by weight of the solids. The starting slurry is subjected to hydrothermal reaction at saturated water vapor pressure of 12 kg/cm² at a temperature of 191° C. for 8 hours in the same autoclave as used in Example 1, with a stirrer blade driven at 112 r.p.m. to obtain a slurry.

With 90 parts (calculated as solids) of the slurry are admixed 4 parts of glass fiber, 3 parts of portland cement and 3 parts of pulp, and the mixture is shaped by a press, but since the resulting mass has a low ability to retain its shape, it is impossible to obtain a shaped body having a density of about 0.1 g/cm³.

What is claimed is:

7. Super-lightweight secondary particles of alumina-containing calcium silicate characterized in that the particles are composed of alumina-containing calcium silicate crystals having an index of crystallite antigrowth of at least 8 and interlocked with one another in the form of a globular shell, the particles being about 5 to about 70 μm in diameter, up to about 0.13 g/cm³ in apparent density and at least 10 g per particle in initial breaking load prepared by the process of claim 6.

8. Secondary particles as defined in claim 7 wherein the alumina-containing calcium silicate crystals have an index of crystallite antigrowth of at least 10.

9. Secondary particles as defined in claim 7 wherein the alumina-containing calcium silicate crystals are needlelike crystals of alumina-containing xonotlite.

10. Secondary particles as defined in claim 7 wherein the alumina-containing calcium silicate crystals are needlelike crystals of alumina-containing xonotlite and other calcium silicate in mixture therewith.

11. An aqueous slurry of calcium silicate crystals uniformly dispersed in water, said crystals comprising super-lightweight secondary particles of alumina containing calcium silicate characterized in that the particles have an index of crystallite antigrowth of at least 8 and interlocked with one another in the form of a globular shell, the particles being about 5 to about 70 μm in diameter, up to about 0.13 g/cm³ in apparent density and at least 10 g per particle in initial breaking load, said slurry being prepared by the process of claim 1.

12. An aqueous slurry as defined in claim 11 which contains a reinforcing material.

13. An aqueous slurry as defined in claim 12 which contains an inorganic fiber as joined to the secondary particles.

1. A process for preparing a uniformly dispersed product slurry of super-lightweight secondary particles of alumina containing calcium silicate in water characterized in that the particles are composed of alumina-containing calcium silicate crystals having an index of crystallite antigrowth of at least 8 and being interlocked with one another in the form of a globular shell, said particles being about 5 to about 70 μm in diameter, up to about 0.13 g/cm$^3$ in apparent density and at least 10 g per particle in initial breaking load, said process comprising mixing together water, a lime material and an amorphous siliceous material containing Na$_2$O and K$_2$O in a total amount of at least 0.5% by weight agitating the resulting mixture to obtain a mixture having 50% of the particles contained therein up to 7 μm in diameter, admixing the agitated mixture with an amount of an alumina material to provide about 1 to about 8% by weight of Al$_2$O$_3$ calculated on the basis of the combined amount of SiO$_2$ and CaO contained in the siliceous material, plus the lime material plus the alumina material, the atomic ratio of silicon atoms to aluminum atoms being at least 5:1 in the lime material, plus the siliceous material plus the alumina material, to obtain a starting slurry containing at least 15 parts by weight of water per part of solids and hydrothermally reacting the starting slurry with stirring to form the product slurry.

5. A process as defined in claim 1 wherein the alumina material is at least one of clay, zeolite and alumina.

6. A process for preparing super-lightweight secondary particles of alumina-containing calcium silicate characterized in that the particles have an index of crystallite antigrowth of at least 8 and interlocked with one another in the form of a globular shell, the particles being about 5 to about 70 μm in diameter, up to about 0.13 g/cm$^3$ in apparent density and at least 10g per particle in initial breaking load characterized by drying the aqueous slurry of alumina-containing calcium crystals defined in claim 1.

14. A process for preparing a shaped body of alumina-containing calcium silicate characterized by shaping the aqueous slurry of alumina-containing calcium silicate crystals defined in claim 11 and drying the shaped mass.

15. A process for preparing a shaped body of alumina-containing calcium silicate characterized by shaping the aqueous slurry of alumina-containing calcium silicate crystals defined in claim 12 and drying the shaped mass.

2. The process of claim 1 in which the alumina-containing calcium silicate crystals comprise alumina-containing xonotlite crystals having a Ca/Si+Al atomic ratio of 0.80 to 1.3.

3. The process of claim 1 in which the alumina-containing calcium silicate crystals comprise a mixture of a major amount of alumina-containing xonotlite crystals having a Ca/Si+Al atomic ratio of 0.8 to 1.3, and a minor amount of alumina-containing tobermorite crystals.

4. The process of anyone of claims 2 or 3 in which the Ca/Si+Al atomic ratio is 0.85 to 1.1.

16. A shaped body of alumina-containing calcium silicate, said shaped body being prepared according to the process of any one of claims 14 or 15, said alumina-containing calcium silicate being characterized in that the shaped body comprises super-lightweight secondary particles of alumina-containing calcium silicate jointed to one another and composed of alumina-containing calcium silicate crystals, the calcium silicate crystals having an index of crystallite antigrowth of at least 8 and being interlocked with one another in the form of a globular shell, the particles before shaping being about 5 to about 70 μm in diameter, up to about 0.13 g/cm$^3$ in apparent density and at least 10g per particle in initial breaking load.

17. A shaped body as defined in claim 16 wherein the alumina-containing calcium silicate is an alumina-containing xonotlite.

18. A shaped body as defined in claim 16 wherein the alumina-containing calcium silicate is a mixture of alumina-containing xonotlite crystals and other calcium silicate crystals.

19. A shaped body as defined in claim 16 which contains a reinforcing material as uniformly dispersed therein.

20. A shaped body of β-wollastonite prepared by firing the shaped body defined in claim 16 at 800° to 1,050° C.

21. A process for preparing a shaped body of β-wollastonite characterized by firing the shaped body of alumina-containing calcium silicate defined in claim 16.

* * * * *